(12) United States Patent
Jin et al.

(10) Patent No.: US 12,436,060 B2
(45) Date of Patent: Oct. 7, 2025

(54) TESTING DEVICE FOR SIMULATING FRICTIONAL WEAR BEHAVIORS OF THREADED JOINT OF DRILL PIPE UNDER TURBID SEAFLOOR ENVIRONMENT

(71) Applicant: HUNAN UNIVERSITY OF SCIENCE AND TECHNOLOGY, Xiangtan (CN)

(72) Inventors: Yongping Jin, Xiangtan (CN); Chang Wu, Xiangtan (CN); Deshun Liu, Xiangtan (CN)

(73) Assignee: HUNAN UNIVERSITY OF SCIENCE AND TECHNOLOGY, Xiangtan (CN)

( * ) Notice: Subject to any disclaimer, the term of this patent is extended or adjusted under 35 U.S.C. 154(b) by 367 days.

(21) Appl. No.: 18/314,660

(22) Filed: May 9, 2023

(65) Prior Publication Data
US 2023/0273089 A1    Aug. 31, 2023

(30) Foreign Application Priority Data
Jan. 13, 2023  (CN) .......................... 202310041501.3

(51) Int. Cl.
*G01M 5/00*    (2006.01)
(52) U.S. Cl.
CPC ........ *G01M 5/0033* (2013.01); *G01M 5/0025* (2013.01)

(58) Field of Classification Search
CPC ............ G01M 5/0033; G01M 5/0025; G01M 99/007; G01N 17/00; G01N 17/002
See application file for complete search history.

(56) References Cited

U.S. PATENT DOCUMENTS 5,757,481 A * 5/1998 O'Brien ............... G01N 21/534
  250/575
2023/0251166 A1* 8/2023 Li ....................... G01M 13/025
  73/865.9

FOREIGN PATENT DOCUMENTS

CN    101153835 A    4/2008
CN    103726832 B    1/2016

\* cited by examiner

*Primary Examiner* — Lee E Rodak
*Assistant Examiner* — Sangkyung Lee

(57) ABSTRACT

A testing device for simulating frictional wear behaviors of threaded joints of a drill pipe under turbid seafloor environment, including a support, an oil cylinder, upper and lower specimens, a first motor, several second motors, stirring rods, a turbidity sensor, and a test tank. The oil cylinder and test tank are arranged on the support. A piston rod of the oil cylinder is connected to the first motor. A rotating-speed sensor is arranged on a bottom surface of the first motor, facing toward an output shaft of the first motor. The output shaft of the first motor is connected to an upper end of a torque limiter. A lower end of the upper specimen fits an upper end of the lower specimen under loading of a main shaft of the first motor. The stirring rods are provided at two sides of the test tank.

7 Claims, 6 Drawing Sheets

TESTING DEVICE FOR SIMULATING FRICTIONAL WEAR BEHAVIORS OF THREADED JOINT OF DRILL PIPE UNDER TURBID SEAFLOOR ENVIRONMENT

CROSS-REFERENCE TO RELATED APPLICATIONS

This application claims the benefit of priority from Chinese Patent Application No. 202310041501.3, filed on Jan. 13, 2023. The content of the aforementioned application, including any intervening amendments thereto, is incorporated herein by reference in its entirety.

TECHNICAL FIELD

This application relates to frictional wear test equipment, and more particularly to a testing device for simulating frictional wear behaviors of a threaded joint of a drill pipe under turbid seafloor environment.

BACKGROUND

During the deep-sea geological drilling, the core bit of the drilling rig will inevitably disturb the seabed sediments, and thus the sediments will be suspended around the drilling rig and are prone to attachment to the threaded joint of the drill pipe. To reach a larger drilling depth, it is usually required to connect another drill pipe to the drive drill pipe. In this case, the lower threaded joint of the drive drill pipe needs to be threadedly connected to the upper threaded joint of the lower drill pipe. However, due to the sediment attachment, the frictional wear between the threaded joints of the drive drill pipe and the lower drill pipe will be accelerated, thereby shortening the service life of the drill pipe and reducing the reliability of the threaded connection between the drive drill pipe and the lower drill pipe. It has not been researched about the friction and wear behaviors of the frictional pair of the threaded joints of the drill pipe in the case of sediment attachment yet. Meanwhile, the existing models, such as spin-disc and ball-disc models, cannot effectively simulate the actual working conditions of the threaded joint frictional pair under the turbid seafloor environment considering the complex stress condition. To this end, it is urgent to develop a testing device for simulating frictional wear behaviors of threaded joints of the drill pipe under the turbid seafloor environment to investigate the frictional wear behaviors in the practical operation.

SUMMARY

An object of the present disclosure is to provide a testing device for simulating frictional wear behaviors of a threaded joint of a drill pipe under turbid seafloor environment with simple structure and convenient operation to overcome the aforementioned deficiencies that the existing testing devices cannot effectively simulate the actual frictional wear of the threaded joints of the drill pipe under the turbid seawater. The frictional wear conditions of the threaded joint surface can be obtained by makeup and breakout. Therefore, the testing device provided herein can facilitate the exploration of the tribological performance and frictional wear mechanisms of the drill pipe threaded joint in turbid seawater environments.

Technical solutions of the present disclosure are described as follows.

The present disclosure provides a testing device for simulating frictional wear behaviors of a threaded joint of a drill pipe under turbid seafloor environment, comprising:
a support;
an oil cylinder;
a displacement sensor;
a rotating speed sensor;
a torque sensor;
a torque limiter;
an upper specimen;
a lower specimen;
a first motor;
a plurality of second motors;
a plurality of stirring rods;
a turbidity sensor;
a test tank;
a control device; and
a base;
wherein the oil cylinder and the test tank are arranged on the support, and the oil cylinder is located directly above the test tank; a piston rod of the oil cylinder is connected to the first motor; an axis of the oil cylinder is parallel to an axis of an output shaft of the first motor; the displacement sensor is arranged on a bottom surface of the oil cylinder; the rotating speed sensor is arranged on a bottom surface of the first motor, and is configured to face toward the output shaft of the first motor; the output shaft of the first motor is connected to an upper end of the torque limiter; a lower end of the torque limiter is connected to an upper end of the upper specimen; a lower end of the upper specimen is threadedly connected with an upper end of the lower specimen under loading of a main shaft of the first motor; the lower specimen is arranged on the base; the base is arranged on the torque sensor; the torque sensor is fixedly provided on a bottom of the test tank; the turbidity sensor is arranged in seawater in the test tank; the plurality of stirring rods are provided at two sides of the test tank; the plurality of stirring rods and the plurality of second motors are connected in one-to-one correspondence; and the control device is connected to the displacement sensor, the rotating speed sensor, the turbidity sensor, the torque sensor, the first motor, and the plurality of second motors.

In some embodiments, the support comprises a bottom plate, an upright post, and a cantilever beam; the upright post is arranged vertically on the bottom plate; a top of the upright post is provided with a motor mounting base; a third motor is arranged on the motor mounting base; the cantilever beam is provided with a guide hole and a threaded hole; the cantilever beam is sleevedly provided on the upright post through the guide hole; an output shaft of the third motor is connected to a screw rod; the screw rod matches with the threaded hole; the oil cylinder is fixedly arranged on the cantilever beam; and the third motor is electrically connected to the control device.

In some embodiments, the testing device further comprises a working electrode, a reference electrode, and a counter electrode; wherein the working electrode is connected to the lower specimen; the reference electrode and the counter electrode are inserted into the seawater in the test tank; and the working electrode, the reference electrode, and the counter electrode are all electrically connected to an electrochemical workstation.

In some embodiments, the test tank is an open rectangular box; a bottom of each of two side walls of the test tank is provided with a hanging lug; the hanging lug is screwedly fixed on the support; tops of the two side walls of the test tank are symmetrically provided with a cover plate; the second motor is arranged on the cover plate; and the plurality of stirring rods are arranged vertically.

In some embodiments, each of the plurality of stirring rods comprises a round rod and two rectangular blade sets; the two rectangular blade sets are arranged on the round rod; each of the two rectangular blade sets comprises two rectangular blades arranged at the same height on the round rod; a projection of one of the two rectangular blade sets on a radial direction of the round rod is perpendicular to a projection of the other of the two rectangular blade sets on the radial direction of the round rod; and the two rectangular blades both have an inclined angle with a horizontal plane.

In some embodiments, the control device comprises a displacement display, a speed display, a turbidity display, a torque display, a cylinder actuation module, a governor, an acquisition control module, and a digital display module; the acquisition control module is electrically connected to the digital display module; the acquisition control module is connected to the third motor, the governor, the displacement display, the speed display, the turbidity display, and the torque display, respectively; the governor is connected to the first motor and the plurality of second motors; the displacement display is electrically connected to the displacement sensor; the speed display is electrically connected to the rotating speed sensor; the turbidity display is electrically connected to turbidity sensor; and the torque display is electrically connected to the torque sensor.

In some embodiments, the cylinder actuation module comprises an oil cylinder motor, a hydraulic pump, an overflow valve, a pressure gauge, and a three-position four-way directional control valve; a rod chamber of the oil cylinder is connected to port A of the three-position four-way directional control valve, and a non-rod chamber of the oil cylinder is connected to port B of the three-position four-way directional control valve; an outlet of the hydraulic pump is connected to port P of the three-position four-way directional control valve; port T of the three-position four-way directional control valve and an inlet of the hydraulic pump are both connected to an oil tank; an input shaft of the hydraulic pump is connected to an output shaft of the oil cylinder motor; a pipe connecting the outlet of the hydraulic pump with the port P of the three-position four-way directional control valve is connected to the oil tank via an overflow pipe; the overflow pipe is provided with the overflow valve; the pressure gauge is provided on the pipe connecting the outlet of the hydraulic pump with the port P of the three-position four-way directional control valve; and the oil cylinder motor is electrically connected to the control device.

Compared to the prior art, the present disclosure has the following beneficial effects.

(1) The testing device provided herein has a simple structure. Seawater and seabed sediments are fed to the test tank through the top opening, and then stirred with the stirring rods arranged at two sides. In this way, the turbid seafloor environment caused by the operation of a drilling rig can be simulated. Furthermore, the friction pair is set as the friction pair of the drill pipe threaded joint, which can easily simulate the actual working condition of the drill pipe threaded joint under the turbid seawater environment.

(2) In this application, several stirring rods are provided at the two sides of the test tank, and are each provided with two rectangular blade sets, where the rectangular blades have a certain deflection angle with respect to the horizontal direction. Under the stirring with the stirring rods, a multi-layer eddy current can be formed in the test tank, which can effectively avoid the dead zone and improve the stirring efficiency to allow uniform dispersion of the seabed sediments, thereby facilitating the simulation of a stable turbid seawater environment.

(3) In this application, the cylinder actuation module can control the vertical movement of the second motor, which provides displacement space for the fastening stroke of the female threaded joint specimen of the drill pipe, thereby facilitating the completion of the makeup of threaded joints and improving the working efficiency.

(4) In this application, a torque limiter is provided between the upper specimen and the output shaft of the second motor. By this arrangement, the torque transmission between the output shaft of the second motor and the upper specimen can be disconnected accurately and quickly when the torque reaches a set value, effectively reducing the error caused by the untimely stopping of the output shaft of the second motor and thus enabling more accurate control of the makeup torque.

(5) The testing device can be used to explore the frictional wear behavior and mechanism of the drill pipe threaded joint under turbid seawater, so as to find a preferable connection solution for the threaded joints of the drill pipe for seabed coring, improving the efficiency and reliability of deep-sea drilling equipment. Therefore, the testing device has great practical significance.

Figure 1:
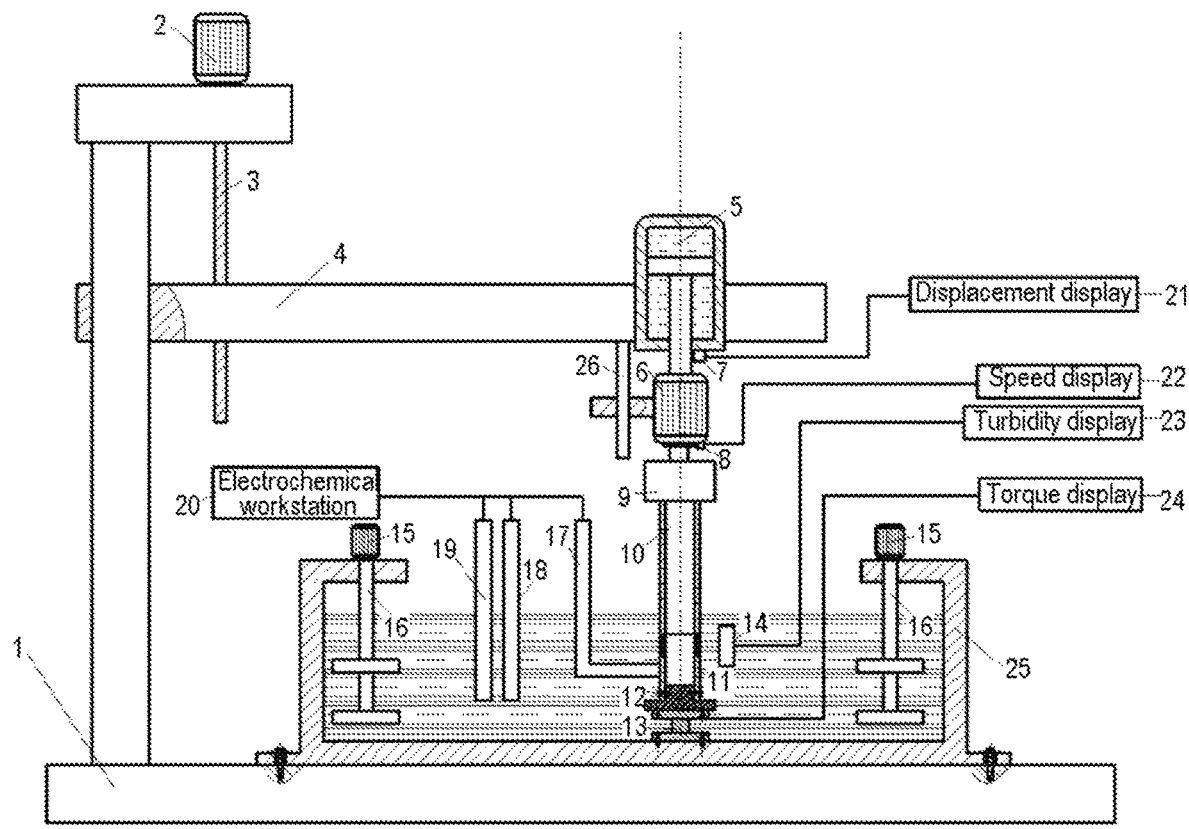
FIG. 1 is a schematic diagram of a testing device for simulating frictional wear behaviors of a threaded joint of a drill pipe under turbid seawater according to an embodiment of the present disclosure.

In the drawings, 1, support; 2, first motor; 3, screw rod; 4, cantilever beam; 5, oil cylinder; 6, second motor; 7, displacement sensor; 8, rotating speed sensor; 9, torque limiter; 10, upper specimen; 11, lower specimen; 12, base; 13, torque sensor; 14, turbidity sensor; 15, third motor; 16, stirring rod; 17, working electrode; 18, reference electrode; 19, counter electrode; 20, electrochemical workstation; 21, displacement display; 22, speed display; 23, turbidity display; 24, torque display; 25, test tank; 26, three-position four-way directional control valve; 27, hydraulic pump; 28, oil cylinder motor; 29, oil tank; 30, overflow valve; and 31, pressure gauge.

DETAILED DESCRIPTION OF EMBODIMENTS

The technical solutions in the embodiments of the present disclosure will be clearly and completely described below with reference to the accompanying drawings.

Figure 2:
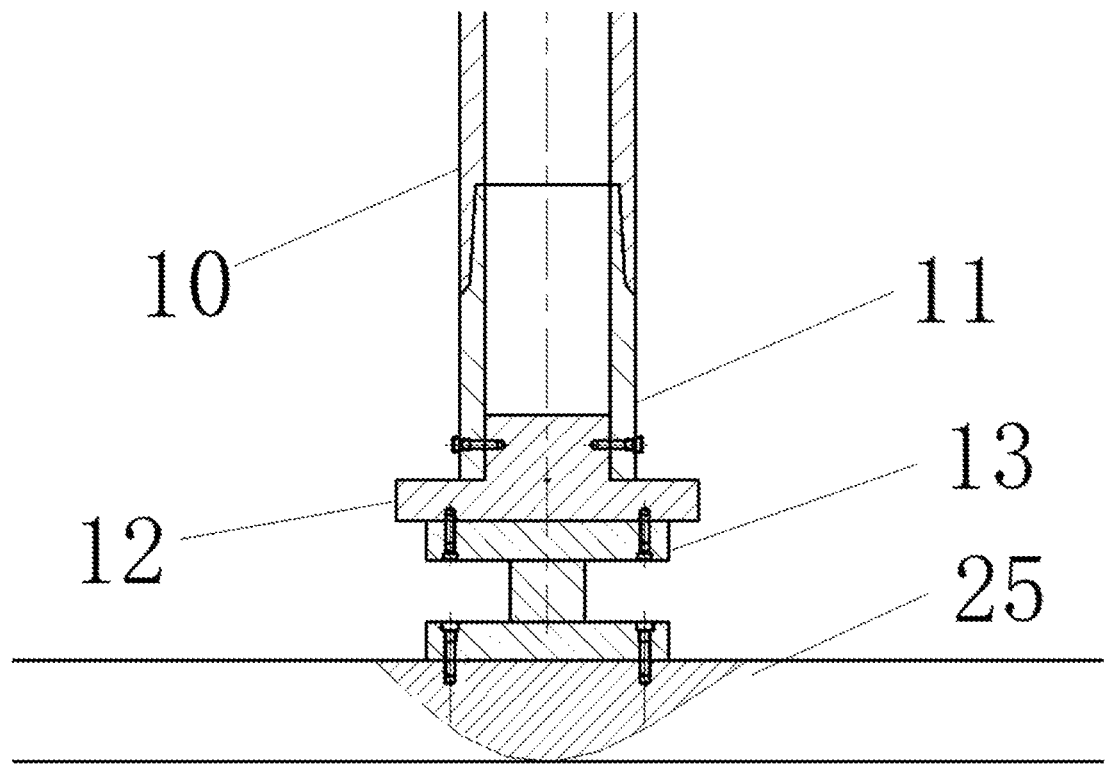
FIG. 2 illustrates an installation of a lower specimen of the testing device according to an embodiment of the present disclosure.

Referring to FIGS. 1 and 2, a testing device for simulating frictional wear behaviors of a threaded joint of a drill pipe under turbid seafloor environment is provided, which includes a support 1, an oil cylinder 5, a displacement sensor 7, a rotating speed sensor 8, a torque sensor 13, a torque limiter 9, a working electrode 17, a reference electrode 18, a counter electrode 19, an upper specimen 10, a lower specimen 11, a first motor 2, a second motor 6, a third motor 15, a stirring rod 16, a turbidity sensor 14, a test tank 25, and a control device.

The support 1 includes a bottom plate, an upright post, and a cantilever beam 4. The upright post is arranged vertically on the bottom plate. A top of the upright post is provided with a motor mounting base, and a first motor 2 is arranged on the motor mounting base. The cantilever beam 4 is provided with a guide hole and a threaded hole. The cantilever beam 4 is sleevedly provided on the upright post through the guide hole. An output shaft of the first motor 2 is connected to a screw rod 3, and the screw rod 3 matches with the threaded hole. The rotation of the first motor 2 drives the rotation of the screw rod 3, thus enabling the cantilever beam 4 to move up and down along the upright post, so as to adjust the height of the cantilever beam 4.

The oil cylinder 5 is fixedly arranged on the cantilever beam 4. The test tank 25 is arranged on the bottom plate, directly below the oil cylinder 5. The test tank 25 is an open rectangular box. A bottom of each of two side walls of the test tank 25 is provided with hanging lug, and the hanging lug is screwedly fixed on the support. Tops of the two side walls of the test tank 25 are symmetrically provided with a cover plate. A third motor 15 is arranged on the cover plate. An output shaft of the third motor 15 is connected to a stirring rod 16. The stirring rod 16 is vertically arranged in the test tank 25. The third motor 15 is configured to drive the stirring rod 16 to rotate to stir the seawater in the test tank 25. The stirring rod 16 includes a round rod and two rectangular blade sets. The two rectangular blade sets are arranged on the round rod. Each of the two rectangular blade sets includes two rectangular blades arranged at the same height. A projection of one of the two rectangular blade sets on a radial direction of the round rod is perpendicular to a projection of the other of the two rectangular blade sets on the radial direction of the round rod. The two rectangular blades both have an inclined angle with a horizontal plane.

A piston rod of the oil cylinder 5 is connected to the second motor 6. An axis of the oil cylinder 5 is parallel to an axis of an output shaft of the second motor 6, and the oil cylinder 5 and the second rotor are both arranged vertically. A displacement sensor 7 is arranged on a bottom surface of the oil cylinder 5. A rotating speed sensor 7 is arranged on a bottom surface of the second motor 6, and is configured to face toward the output shaft of the second motor 6. The output shaft of the second motor 6 is connected to an upper end of the torque limiter 8. A lower end of the torque limiter 8 is connected to an upper end of an upper specimen 10. A lower end of the upper specimen 10 is threadedly connected to an upper end of a lower test specimen 11 under loading of the main shaft of the second motor 6, where the lower end of the upper test specimen is a female threaded joint of a drill pipe, and the upper end of the lower test specimen is a male threaded joint of the drill pipe. The lower test specimen 11 is arranged on a base 12, the base 12 is arranged on a torque sensor 13, and the torque sensor 13 is fixedly connected to a base plate of a test tank 25. The test tank 25 is provided with seawater which submerges an upper end face of the upper specimen 11 when the upper specimen is unbuckled. A turbidity sensor 14 is arranged in the seawater within the test tank. An input port of a speed display 22 is connected to the rotating speed sensor 8. A torque display 24 is connected to the torque sensor 13. An input port of a turbidity display 23 is connected to the turbidity sensor 14.

Figure 3:
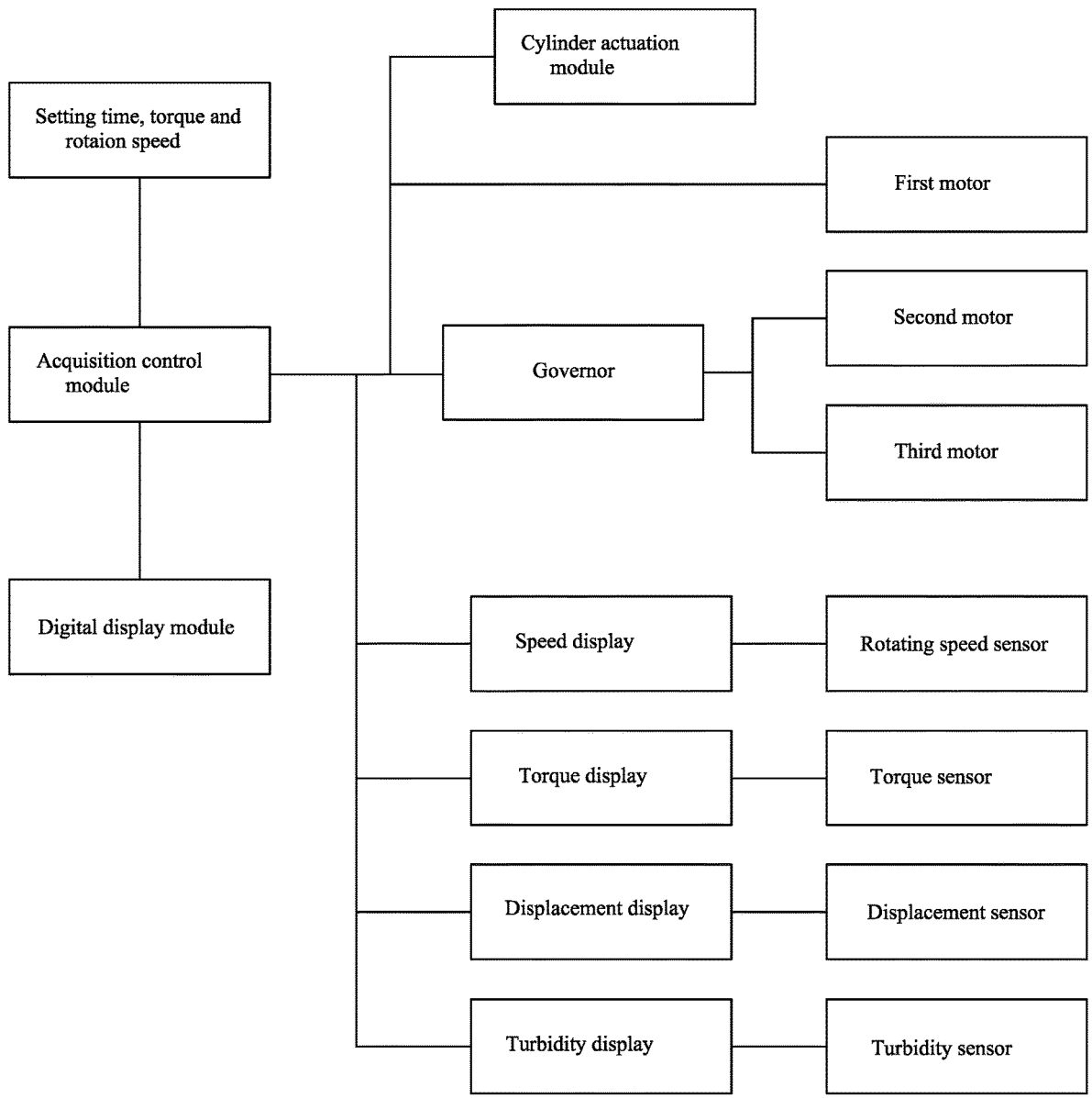
FIG. 3 schematically shows a structure of a control system of the testing device according to an embodiment of the present disclosure.

As shown in FIG. 3, the control device includes a displacement display 21, a speed display 22, a turbidity display 23, a torque display 24, a cylinder actuation module, a governor, an acquisition control module, and a digital display module. The acquisition control module is electrically connected to the digital display module. The acquisition control module is connected to the first motor, the governor, the displacement display, the speed display, the turbidity display, and the torque display respectively; the governor is connected to the second motor and the third motor. The displacement display is electrically connected to the displacement sensor. The speed display is electrically connected to the rotating speed sensor. The turbidity display is electrically connected to the turbidity sensor. The torque display is electrically connected to the torque sensor.

Figure 4:
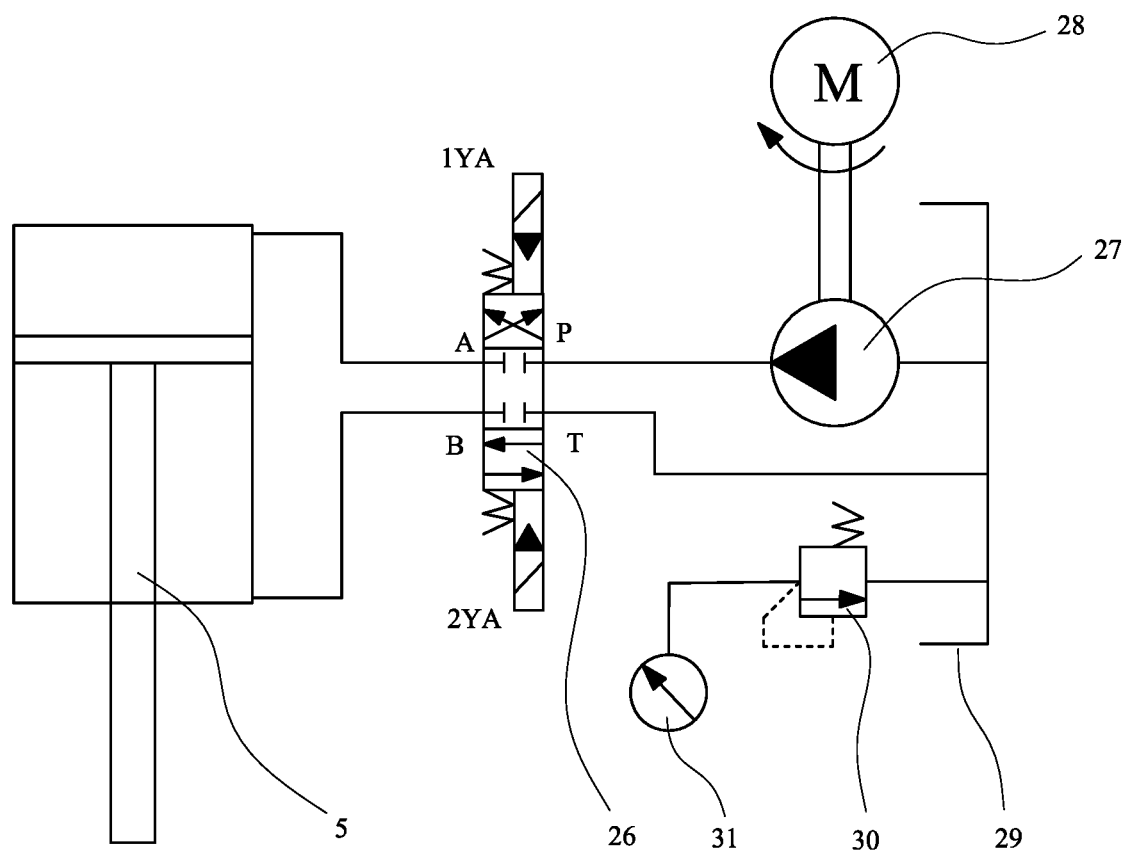
FIG. 4 is a circuit diagram of the testing device of the according to an embodiment of the present disclosure.
Figure 5:
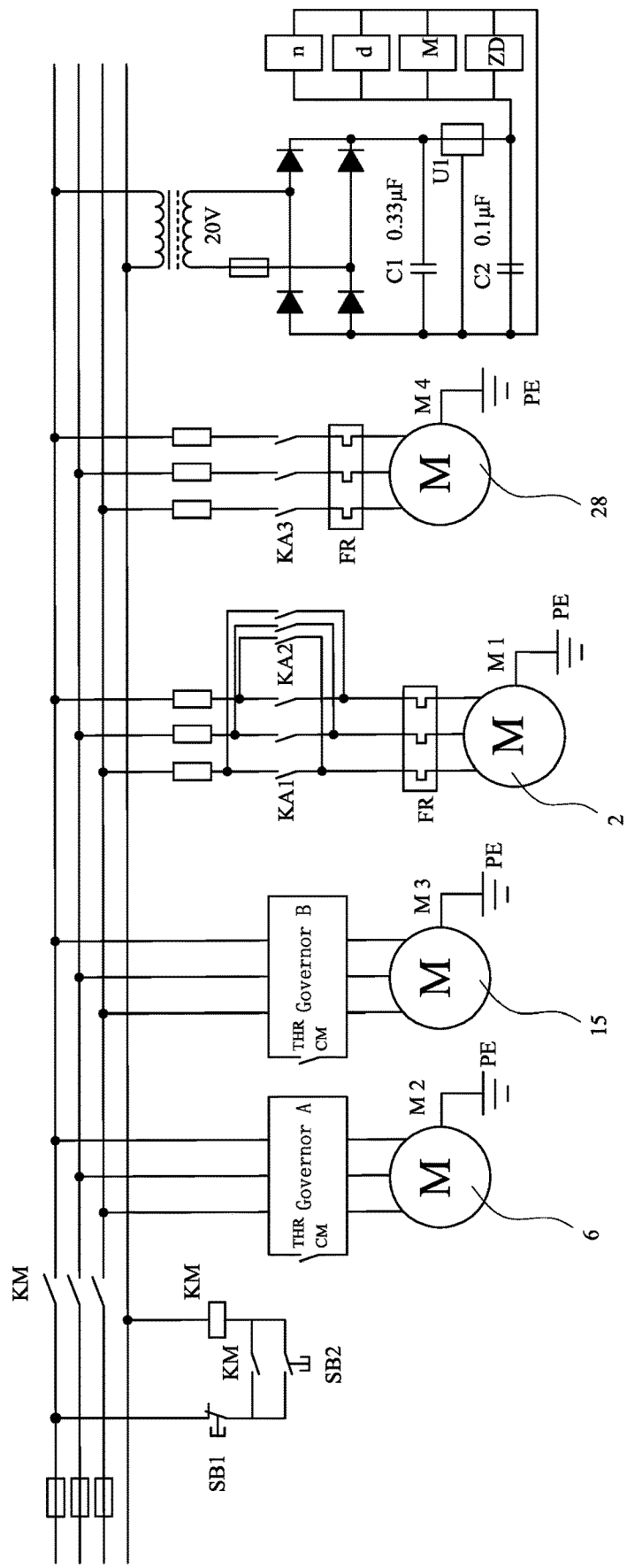
FIG. 5 is a circuit schematic diagram of the control system of the testing device according to an embodiment of the present disclosure.
Figure 6:
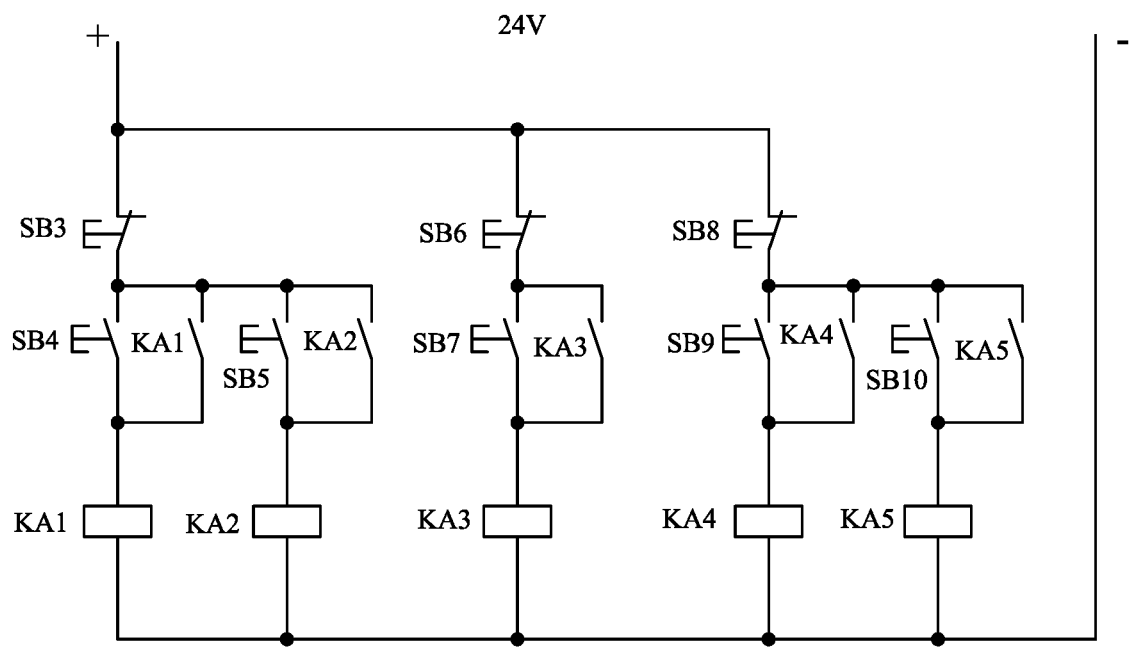
FIG. 6 is a control schematic diagram of relays for the control system of the testing device according to an embodiment of the present disclosure.

As shown in FIG. 4, the cylinder actuation module includes an oil cylinder motor 28, a hydraulic pump 27, an overflow valve 30, a pressure gauge 31, and a three-position four-way directional control valve 26. A rod chamber of the oil cylinder is connected to port A of the three-position four-way directional control valve 26, and a non-rod chamber of the oil cylinder is connected to port B of the three-position four-way directional control valve 26. An outlet of the hydraulic pump 27 is connected to the P port of the three-position four-way directional control valve 26. T port of the three-position four-way directional control valve 26 and an inlet of the hydraulic pump are both connected to an oil tank 29. An input shaft of the hydraulic pump 27 is connected to an output shaft of the oil cylinder motor 28. The pipe connecting an outlet of the hydraulic pump 27 and the P-port of the three-position four-way directional control valve 26 is connected to the oil tank via an overflow pipe. The overflow pipe is provided with the overflow valve 30. The pressure gauge 31 is provided on the pipe connecting the outlet of the hydraulic pump 27 and the P-port of the three-position four-way directional control valve 26. The oil cylinder motor 28 is electrically connected to the control device.

The working principles of the testing device provided in the present disclosure are described as follows.

When the testing device is in use, the switch SB2 is closed to energize the relay KM is energized such that the normally open contact of the relay KM is closed, then the whole control circuit is energized. After that, the switch SB4 is closed to energize the relay KA1 such that the normally open contact of the relay KA1 is closed, then the first motor 2 rotates positively. The first motor 2 is started to control the cantilever beam 4 to descend, so as to adjust the position of the upper specimen 10. When the upper specimen 10 is close to the lower specimen 11, the normally closed switch SB3 is disconnected to de-energize the relay KA1 such that the normally open contact of the relay KA1 is disconnected, and then the first motor 2 is powered off. The test tank 25 is finely tuned to allow the upper specimen 10 to be aligned with the lower specimen 11. After that, the screws on the lugs of the test tank 25 are tightened to fix the test tank on the base of the support. Then all the sensors are turned on. Seawater and sediments are fed to the test tank in an appropriate proportion through the opening above the test tank 25. The third motor 15 rotates under the control of the governor B, so as to drive the stirring rod 16 to rotate such that the seawater and the sediments are fully mixed. After the sediments and seawater are fully mixed evenly and stable observed by the turbidity display 23, the switch SB7 is closed to energize the relay KA3 such that the normally open contact of the relay KA3 is closed, then the oil cylinder motor is started. The switch SB9 is closed to energize the relay KA4 such that the normally open contact of the relay KA4 is closed, then the electromagnet 1YA of the three-position four-way direction control valve 26 in FIG. 4 is powered on, and the oil cylinder 5 is extended. The axial position of the upper specimen 10 is adjusted with the oil cylinder 5 to allow the lower surface of the upper specimen 10 to be pressed against the upper surface of the lower specimen 11. Then the second motor 6 rotates positively under the control of the governor A to drive the upper specimen 10 to be buckled with the threaded joint of the drill pipe through the torque limiter 9. The rotating speed and axial screwing stroke of the upper specimen 10 can be observed through the speed display 22 and the displacement display 21, respectively. When the set torque is reached, the torque limiter 9 automatically disconnects the torque transfer between the second motor 6 and the upper specimen 10. The torque is transmitted to the torque sensor 13 through the upper specimen 10, the lower specimen 11 and the base 12. In this way, the actual buckling torque of the threaded joint of the drill pipe specimen can be observed on the torque display 24. After the buckling of the upper specimen 10 and the lower specimen 11, the second motor stops rotating under the control of the governor A. The normally closed switch SB8 is disconnected to de-energize the relay KA4 such that the normally open contact of the relay KA4 is disconnected, then the electromagnet 1YA of the three-position four-way direction control valve 26 is powered off, and the oil cylinder 5 stops extending. After the main shaft stops rotating, the second motor 6 rotates reversely under the control of the governor A. The switch SB10 is closed to energize the relay KA5 such that the normally open contact of the relay KA5 is closed, then the electromagnet 1YA of the three-position four-way direction control valve 26 is powered on, and the oil cylinder contracts. The oil cylinder 5 pulls the second motor 6 upwards, and the second motor 6 rotates reversely to drive the upper specimen 10 to be unbuckled with the threaded joint of the drill pipe through the torque limiter 9. The unbuckling rotating speed of the upper specimen 10 can be observed on the speed display 22. The torque is transmitted to the torque sensor 13 through the upper specimen 10, the lower specimen 11 and the base 12, so that the unbuckling torque of the threaded joint specimen of the drill pipe can be observed on the torque display 24. When the test is completed, the normally closed switch SB1 is disconnected to de-energize the relay KM such that the normally open contact of the relay KM is disconnected, then the whole circuit is powered off. During the buckling and unbuckling of the threaded joint of the drill pipe, frictional wears on the surface of the thread joint occur. By repeated makeup and breakout of the drill pipe threaded joint specimens, the frictional wear behaviors of the threaded joints in the turbid seawater environment can be obtained, which is beneficial to the exploration of the tribological performance and frictional wear mechanisms of the drill pipe threaded joints in turbid seawater environments.

What is claimed is:

1. A testing device for simulating frictional wear behaviors of a threaded joint of a drill pipe under turbid seafloor environment, comprising:
   a support;
   an oil cylinder;
   a displacement sensor;
   a rotating speed sensor;
   a torque sensor;
   a torque limiter;
   an upper specimen;
   a lower specimen;
   a first motor;
   a plurality of second motors;
   a plurality of stirring rods;
   a turbidity sensor;
   a test tank;
   a control device; and
   a base;
   wherein the oil cylinder and the test tank are arranged on the support, and the oil cylinder is located directly above the test tank; a piston rod of the oil cylinder is connected to the first motor; an axis of the oil cylinder is parallel to an axis of an output shaft of the first motor; the displacement sensor is arranged on a bottom surface of the oil cylinder; the rotating speed sensor is arranged on a bottom surface of the first motor, and is configured to face toward the output shaft of the first motor; the output shaft of the first motor is connected to an upper end of the torque limiter; a lower end of the torque limiter is connected to an upper end of the upper specimen; a lower end of the upper specimen is threadedly connected with an upper end of the lower specimen under loading of a main shaft of the first motor; the lower specimen is arranged on the base; the base is arranged on the torque sensor; the torque sensor is fixedly provided on a bottom of the test tank; the turbidity sensor is arranged in seawater in the test tank; the plurality of stirring rods are provided at two sides of the test tank; the plurality of stirring rods and the plurality of second motors are connected in one-to-one correspondence; and the control device is connected to the displacement sensor, the rotating speed sensor, the turbidity sensor, the torque sensor, the first motor, and the plurality of second motors.

2. The testing device of claim 1, wherein the support comprises a bottom plate, an upright post, and a cantilever beam; the upright post is arranged vertically on the bottom plate; a top of the upright post is provided with a motor mounting base; a third motor is arranged on the motor mounting base; the cantilever beam is provided with a guide hole and a threaded hole; the cantilever beam is sleevedly provided on the upright post through the guide hole; an output shaft of the third motor is connected to a screw rod; the screw rod matches with the threaded hole; the oil cylinder is fixedly arranged on the cantilever beam; and the third motor is electrically connected to the control device.

3. The testing device of claim 1, further comprising:
   a working electrode;
   a reference electrode; and
   a counter electrode;
   wherein the working electrode is connected to the lower specimen; the reference electrode and the counter electrode are inserted into the seawater in the test tank; and the working electrode, the reference electrode, and the counter electrode are all electrically connected to an electrochemical workstation.

4. The testing device of claim 1, wherein the test tank is an open rectangular box; a bottom of each of two side walls of the test tank is provided with a hanging lug; the hanging lug is screwedly fixed on the support; tops of the two side walls of the test tank are symmetrically provided with a cover plate; the second motor is arranged on the cover plate; and the plurality of stirring rods are arranged vertically.

5. The testing device of claim 1, wherein each of the plurality of stirring rods comprises a round rod and two rectangular blade sets; the two rectangular blade sets are arranged on the round rod; each of the two rectangular blade sets comprises two rectangular blades arranged at the same height on the round rod; a projection of one of the two rectangular blade sets on a radial direction of the round rod is perpendicular to a projection of the other of the two rectangular blade sets on the radial direction of the round rod; and the two rectangular blades both have an inclined angle with a horizontal plane.

6. The testing device of claim 2, wherein the control device comprises a displacement display, a speed display, a turbidity display, a torque display, a cylinder actuation module, a governor, an acquisition control module, and a digital display module; the acquisition control module is electrically connected to the digital display module; the acquisition control module is connected to the third motor, the governor, the displacement display, the speed display, the turbidity display, and the torque display; the governor is connected to the first motor and the plurality of second motors; the displacement display is electrically connected to the displacement sensor; the speed display is electrically connected to the rotating speed sensor; the turbidity display is electrically connected to turbidity sensor; and the torque display is electrically connected to the torque sensor.

7. The testing device of claim 6, wherein the cylinder actuation module comprises an oil cylinder motor, a hydraulic pump, an overflow valve, a pressure gauge, and a three-position four-way directional control valve; a rod chamber of the oil cylinder is connected to port A of the three-position four-way directional control valve, and a non-rod chamber of the oil cylinder is connected to port B of the three-position four-way directional control valve; an outlet of the hydraulic pump is connected to port P of the three-position four-way directional control valve; port T of the three-position four-way directional control valve and an inlet of the hydraulic pump are both connected to an oil tank; an input shaft of the hydraulic pump is connected to an output shaft of the oil cylinder motor; a pipe connecting the outlet of the hydraulic pump with the port P of the three-position four-way directional control valve is connected to the oil tank via an overflow pipe; the overflow pipe is provided with the overflow valve; the pressure gauge is provided on the pipe connecting the outlet of the hydraulic pump with the port P of the three-position four-way directional control valve; and the oil cylinder motor is electrically connected to the control device.

* * * * *